US010798128B2

(12) United States Patent
Forget et al.

(10) Patent No.: US 10,798,128 B2
(45) Date of Patent: Oct. 6, 2020

(54) DISTRIBUTED AUTHENTICATION FOR SERVICE GATING

(71) Applicant: 2236008 Ontario Inc., Waterloo (CA)

(72) Inventors: Leo F. Forget, Ottawa (CA); Rob Krten, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 247 days.

(21) Appl. No.: 15/658,145

(22) Filed: Jul. 24, 2017

(65) Prior Publication Data
US 2019/0028513 A1 Jan. 24, 2019

(51) Int. Cl.
*H04L 29/06* (2006.01)

(52) U.S. Cl.
CPC .......... *H04L 63/20* (2013.01); *H04L 63/0807* (2013.01); *H04L 63/10* (2013.01); *H04L 63/123* (2013.01)

(58) Field of Classification Search
CPC ..... H04L 63/20; H04L 63/10; H04L 63/0807; H04L 63/123
See application file for complete search history.

(56) References Cited

U.S. PATENT DOCUMENTS

| 2005/0038790 A1* | 2/2005 | Wolthusen | H04L 41/0893 |
| 2010/0138905 A1* | 6/2010 | Kass | G06F 21/33 726/7 |
| 2011/0035586 A1* | 2/2011 | Clermont | G06F 21/53 713/164 |
| 2012/0084570 A1* | 4/2012 | Kuzin | G06F 21/41 713/182 |
| 2013/0151849 A1* | 6/2013 | Graham | H04L 9/32 713/164 |
| 2014/0142781 A1* | 5/2014 | Becker | B60R 99/00 701/1 |
| 2015/0331809 A1* | 11/2015 | Satyavolu | G06F 9/4401 711/104 |

OTHER PUBLICATIONS

Wang Xiaolong et al, 11 Enhanced Security of Building Automation Systems Through Microkernel-Based Controller Platforms. 2017 IEEE 37th International Conference on Distributed Computing Systems Workshops (ICDCSW)• IEEE. Jun. 5, 2017 (Jun. 5, 2017). pp. 37-44. XP033122901.

(Continued)

*Primary Examiner* — Khoi V Le
(74) *Attorney, Agent, or Firm* — Rowand LLP

(57) ABSTRACT

A system and method enforce a security policy in a message-based operating system by controlling access to an operating system authenticator. The control occurs in response to an invocation of a microkernel call that initiates a process manager's function in accordance with the access right retained stored in a microkernel. The system and method control access to a server serving a client in the message-based operating system according to a token. The token is issued by the operating system authenticator and establishes a client's access to the services provided by the server.

18 Claims, 4 Drawing Sheets

(56) References Cited

OTHER PUBLICATIONS

Chayni ka Kapoor et al: 11 Kernel Operating 1-14, System11, IJRIT International Journal of Research in Information Technology International Journal of Research in Information Technology. Oct. 1, 2014 (Oct. 1, 2014). pp. 96-106. XP055495381.
Branstad M et al: "Access meditation in a 1-14 message passing kernel". Proceedings of the Symposium on Security and Privacy. Oakland. May 1-3. 1989; [Proceedings of the Symposium on Security and Privacy]. Washington. IEEE Comp. Soc. Press. US., vol. -. May 1, 1989 (May 1, 1989). pp. 66-72. XP010016008. DOI: 10.1109/SECPRI.1989.
EESR dated Jan. 2, 2019, EP Application No. 18183808.7.

\* cited by examiner

DISTRIBUTED AUTHENTICATION FOR SERVICE GATING

BACKGROUND OF THE DISCLOSURE

Technical Field

This disclosure relates to security; and in particular, to enforcing security policies in distributed message-based operating systems.

BRIEF DESCRIPTION OF THE DRAWINGS

This disclosure refers to the following drawings and description. The components in the drawings are not necessarily to scale; emphasis instead is placed upon illustrating the principles described. Moreover, in the figures, like referenced numerals designate corresponding parts throughout the different views.

DETAILED DESCRIPTION

For years, security has been the focus of end-user software. These programs adhere closely to secure practices while security hackers invest heavily in breaking those practices. Today, security begins when software is written and continues as the software is executed. Software is tested early and often. However, exposing flaws in software can be harder than designing the software because the software operates on a foundation called an Operating System (OS). An OS supports a computer's basic functions such as coordinating and manipulating computer hardware, scheduling tasks, and controlling access to peripheral devices.

When tasks are part of a message-based OS, such as a microkernel-based OS, for example, the message-based OS builds smaller tasks than those normally run by monolithic kernels. Some tasks are limited to memory management, process management, timer services, scheduling services and communication. Distributed processes (referred to as servers) and querying programs (referred to as clients) execute other tasks. Generally, the term processes refers to a series of actions and/or multiple threads. Unlike monolithic kernels, microkernels execute only the minimum computer requirements for an input and an output. Other processes, such as a file system management or drivers, for example, are managed outside of the microkernel through separate servers. Here, the clients and servers are distributed. The distributed clients and servers present security risks because these processes and programs do not enforce security policies or make use of security mechanisms.

Figure 1:
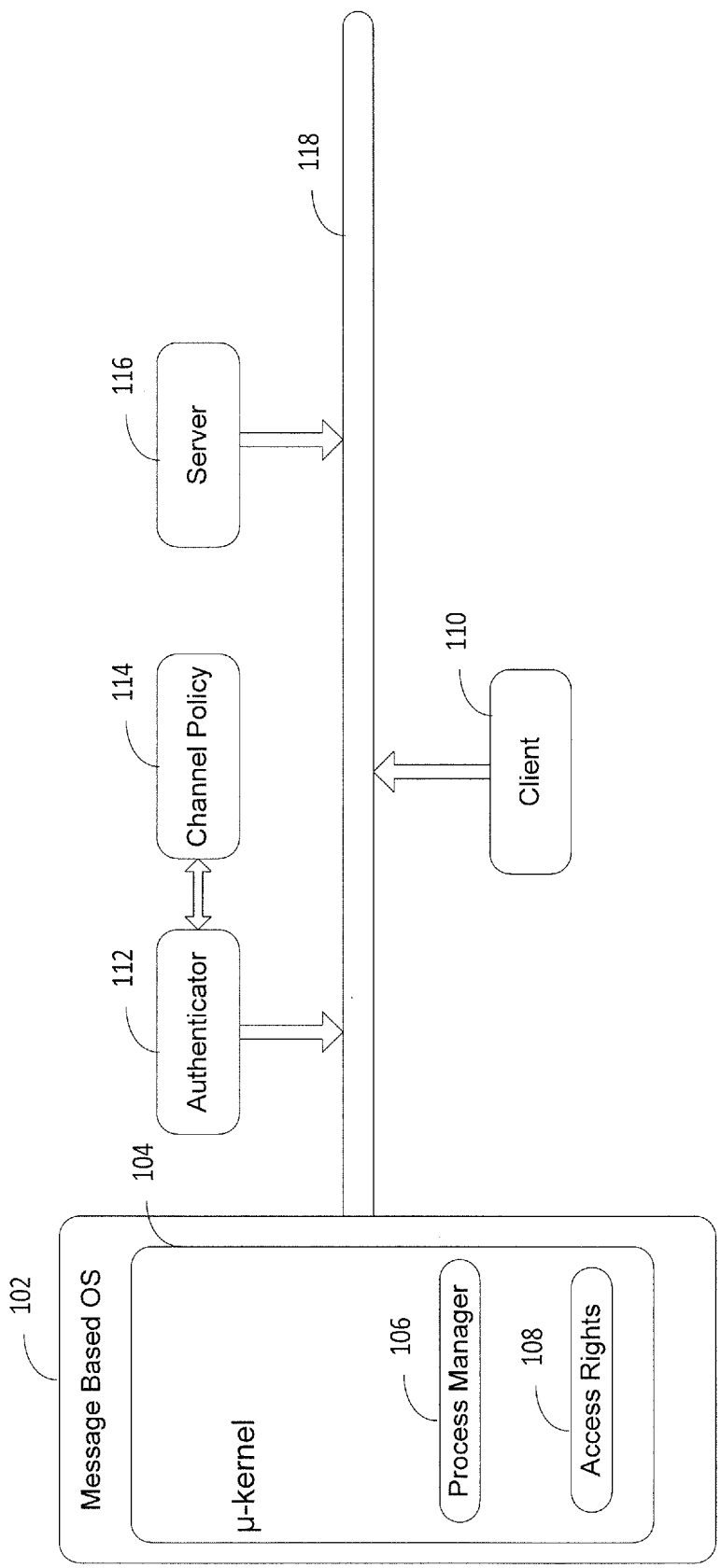
FIG. 1 is a message-based operating system enforcing security policies.

FIG. 1 is block diagram of a message-based OS enforcing security policies. The message-based OS includes a microkernel 104, access rights 108, a channel policy 114, and a set of application processes 110-112, 116, and 118 created by a process manager 106. The process manager 106 provides OS services that may include process creation, process accounting, memory management, and/or pathname space management, etc. The process manager 106 receive messages from other OS processes, may spawn new OS processes, may terminate OS processes, and manage the OS processes' lifetime. The channel policy 114 may be a file or database where the security policy for the system resides. The channel policy 114 is consulted by authenticator 112, which determines the rights and permissions associated with any request.

In FIG. 1, self-verifying security is based on two credentials: access rights and tokens. Access rights provide permissions to communicate with other processes such as the servers 116 (one is shown) and the authenticator 112. Before clients 110 (one is shown) establish message channels 118 (one is shown), they receive access rights 108 from the process manager 106. The access rights 108 are granted when clients 110 are created or when clients 110 invoke microkernel calls that initiate process manager functions.

When access rights are granted, a client 110 creates a message channel 118 and identifies itself through authenticating information. The authenticating information contains information that the authenticator 112 processes to verify client 110 identity. The authenticating information may be encrypted in a data object, delivered via messaging, and include routing information. The authenticating information ensures that the requesting entity, here, the client 110, receives only access rights that it is entitled. The authenticating information may include the client's name, a unique identifier, and an optional timestamp. Once issued, the authenticating information may be processed until the authenticating information expires.

In some systems, a comparator and timestamp validator within the authenticator 112 validates the timestamp through timing rendered by separate synchronized clocks. The client 110 and authenticator 112, respectively, access the separate synchronized clocks when transmitting to other OS nodes— one for a timestamp appended by the issuing node the other for a reference value used in a comparison executed by the validating node. If a comparator at the validating node determines that a timestamp is too far in the future or too far in the past (e.g., beyond certain thresholds), the authenticator 112 transmits an error message to client 110.

Figure 2:
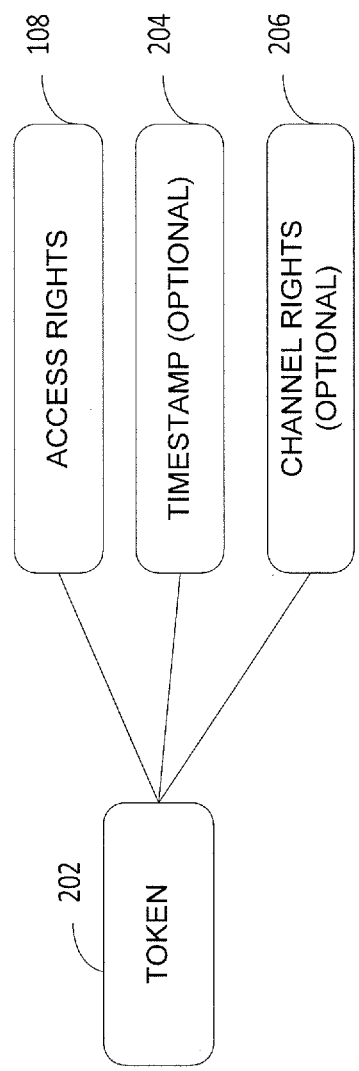
FIG. 2 is an example token passed between operating system nodes.

If the timestamp is valid, the authenticator 112 looks up the authenticating information in the channel policy 114 files within memory. When the authenticating information is found in the channel policy 114, the authenticator 112 sends a token 202 to the client 110 through the message channel 118. A token 202 encapsulates the permissions given to access some or all of the OS resources that supplement the microkernel 104. Some tokens 202 define the operations a client 110 may execute and the rights to access, view, and/or use, the services provided by a server 116. The access rights 108 may also include the rights to create a message channel 118, rights to access one or more servers 116, rights to access other OS resources, permissions to execute certain operations (such as the ability to inspect, open, or transfer files), and/or etc. Some tokens 202 encapsulate optional fields that reflect the client's 110 rights to generate a communication channel 118 (optional channel rights 206) and an optional timestamp 204, as shown in FIG. 2. The optional timestamp 204 allows the client 110 to access the server 116 or other OS resources multiple times until the token 202 expires without further authentication. If the optional timestamp 204 is used, software within server 116 compares the timestamp to a reference time via the synchronized clocks described above to determine if the difference falls within an accepted range (e.g., via a comparator and timestamp validator) and therefore, is valid.

Unlike security policies enforced in other distributed networks, a system security architect or a security mechanism assigns channel policies 114 that define the rights and operations that are granted to clients 110, and in alternate, define the rights and operations that are granted to clients 110 and servers 116 when the OS is created. The channel policies 114 do not change after the system is created. The channel policies are stored in non-volatile forms such as an image that is retained in a file. The persistence of the file means that the mandatory access controls established by the channel policies 114 are not supplemented and do not change once the channel policies 114 are established. This permanence means that the systems are less vulnerable to attacks because the channel policies 114 do not change once the OS is generated.

In FIG. 1, the client 110 saves the token 202 in memory. In some systems, clients 110 obtain separate tokens 202 for each server 116 or OS resource the client 110 accesses. Should a client 110 need a token, the authenticator 112, in response to the client's 110 request, decrypts the client's 110 authenticating information from the client request, compares the authenticating information against the channel policies 114, and compares the timestamp against a current time. If there is a match or if the difference falls within an acceptable range, the authenticator 112 sends back another token to the client 110 through the message channel 118. In other OS systems, access to each of the servers 116 or OS resources the client 110 requests occurs once in time or once during each processing session, which effectively conserves bandwidth. Generally, a session means the time during which a process like the microkernel 104 accepts and processes input. It is also the time in which a querying program and a process (e.g., a client 110 and a server 116), or a process and the microkernel 104, maintains a communication connection. Each of the permissions granted for the distributed servers 116 is encapsulated in one or more tokens 202 that are sent back via a message and stored at the client 110. Generally, the term encapsulated refers to constructed according to a single protocol.

When the client 110 accesses the services provided by the server 116, the client first generates a message similar to the message it sent to the authenticator 112. The client 110 encodes authenticating information via a data object consisting of the client's name, a unique identifier, a token 202, and an optional timestamp. The data object may also include routing information. The client transmits the data object to the server 116, which decrypts and verifies the authenticating information as discussed previously. If a token 202 specifies access to limited services (e.g., a sub-set of all of the services a server 116 provides), the server 116 restricts the client's access to only its authorized services. Because the messaging channel 118 between a client 110 and server 116 remains open until the process manager 106, client 110, or server 116 closes it (meaning it is persistent), neither the authenticating information nor token is exchanged with each communication between the client 110 and server 116 in some systems. However, when spoofing is detected, some or each client 110 and/or server 116 transmission may include a token 202 that is then validated at the receiving node to ensure that each communication originates from authorized processes and/or programs.

When mutual authentication is practiced, the server 116 receives access rights 108 from the process manager 106 and tokens 202 from the authenticator 112 in the same manner as those the client 110 receives its rights and tokens 202 as described above. When a server 116 receives its token 202 from the authenticator 112, the server 116 sends its own authenticating information to the client 110 through a data object consisting of the server's name, a unique identifier, a token 202, and an optional timestamp to the client 110 in response to the client's 110 request. Once the server 116 is authenticated at the client 110, the client 110 verifies the access rights the client can provide to the server 116. In one implementation, the access rights grant the server 116 rights to communicate with the client 110.

Figure 3:
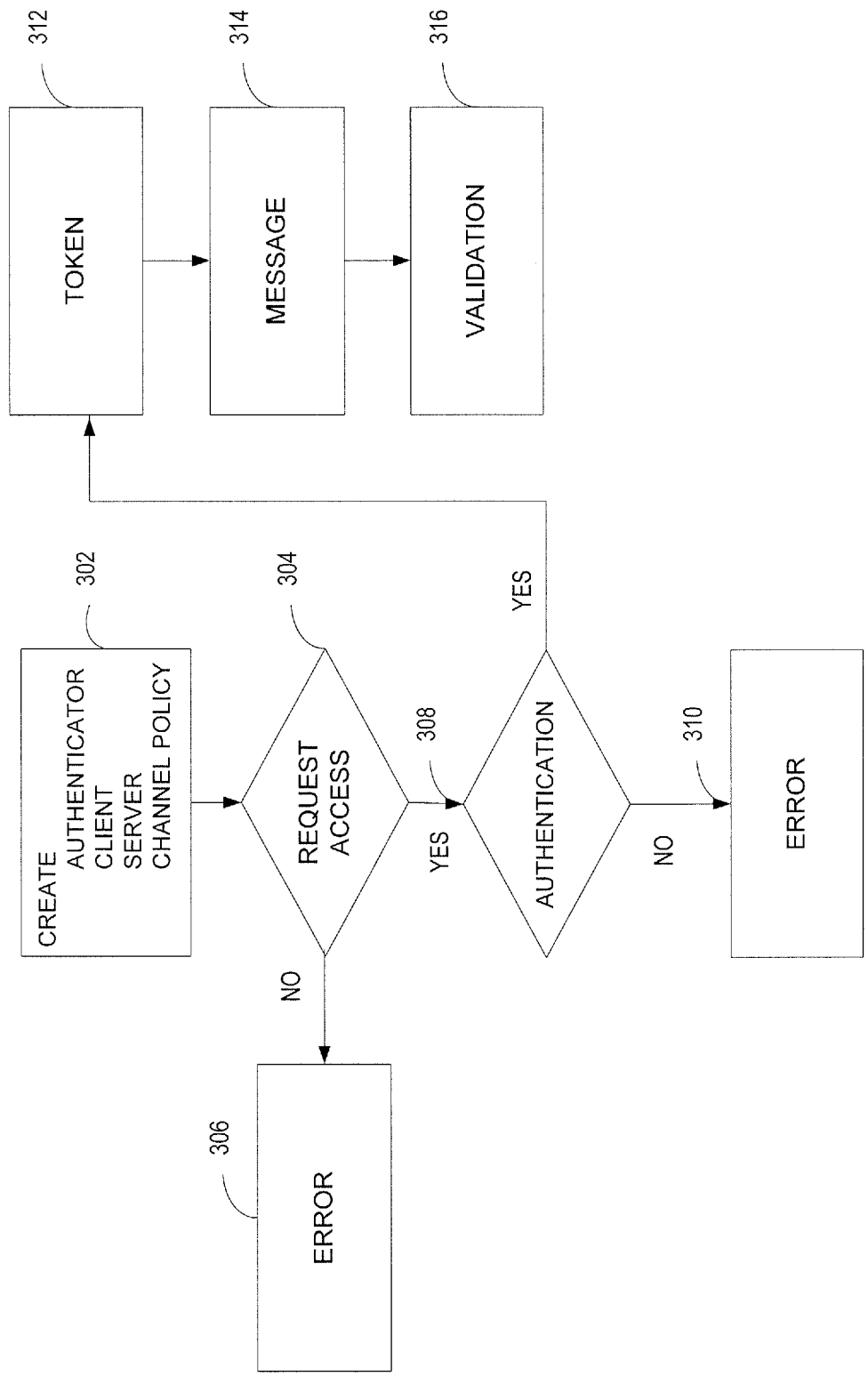
FIG. 3 is a secure message-based operating system protocol.

FIG. 3 is flow diagram of a secure message-based operating system protocol. The protocol shown in FIG. 3 is a series of steps, involving two or more entities, designed to authenticate access to a service provided by server 116. A "series of steps" generally refers to a sequence, from start to finish. "Involving two or more entities" generally refers to least two entities being involved to complete the protocol; one entity alone does not make a protocol. Finally, "designed to authenticate access to a service provided by server 116" generally refers to the protocol informing the server 116 of which services can be accessed by the client 110. Once established, client 110 can make use of that service under the terms and conditions specified by the token.

Figure 4:
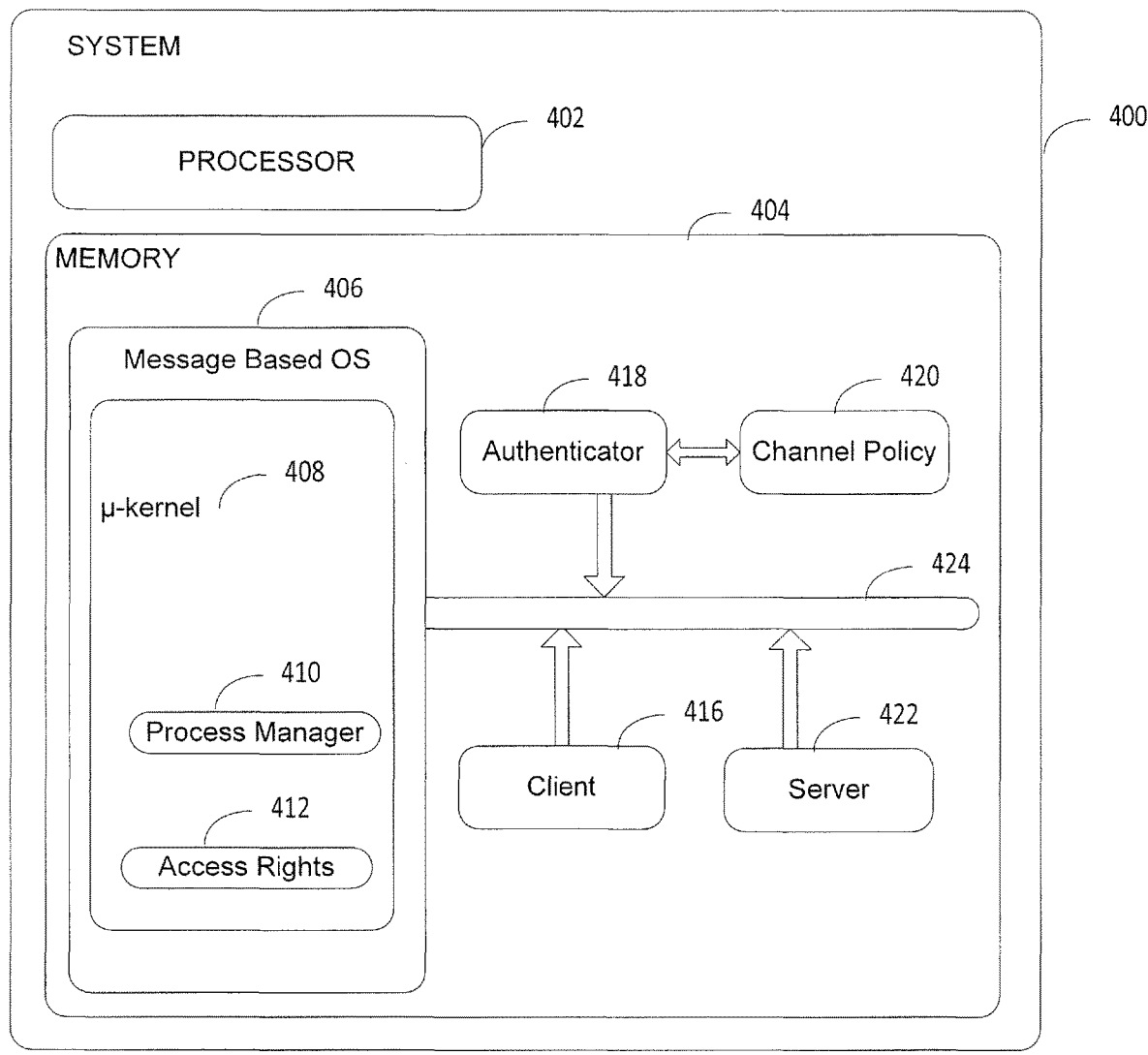
FIG. 4 is an alternate message-based operating system enforcing security policies.

The protocol of FIG. 3 may be implemented using the systems described in FIGS. 1 and 4. The protocol provides privacy, authentication, and security to a distributed message-based OS. Security is based on multiple credentials: access rights 108 and tokens 202. Access rights 108 provide permissions to communicate with other processes and querying programs. Tokens 202 encapsulate the permissions to access some or all of the distributed services provided by a server 116. Some tokens 202 provide rights to create one or more message channels 118, rights to access OS resources, and/or rights that allow a process or program to execute certain operations, etc. In FIG. 3, the process manager 106 creates the application processes 110-112, 116 and 118 that include the client 110 process, the authenticator 112 process, and the server 116 process at 302.

When access rights are granted by the process manager 106 at 304, the client 110 creates a message channel 118 to the authenticator 112 and requests access rights 108 to server 116 at 308. When access rights 108 are denied the process manager 106 transmits an error message to the client 110 at 306.

If the timestamp is valid, the authenticator 112 looks up the authenticating information in the channel policy 114 files or database records. When authenticating information is not found in the channel policy 114, the authenticator issues an error message to the client 110 at 310. When the authenticating information is found in the channel policy 114, the authenticator 112 sends a token 202 to the client 110 through the message channel 118 at 312. A token 202 encapsulates the permissions to access OS resources that supplement the microkernel 104. Some tokens 202 define the operations granted to one or more clients 110 including rights to create a message channel 118, rights to access one or more servers 116, rights to access other OS resources, and/or permissions to execute certain operations. Some tokens 202 include a timestamp that allows the client 110 to access the server 116 or other OS resources multiple times until a timestamp validating process notifies the server 116 that the token expired.

When the client 110 desires to access processes provided by the server 116, the client 110 generates a message like the message it sends to the authenticator 112 as previously described at 314. The client 110 encodes authenticating information via a data object consisting of: the client's name, a unique identifier, a token 202, and an optional timestamp. The data object may also include routing information. The server 116 decrypts and verifies the authenticating information as discussed above and verifies the permissions granted to server 116 at 316. If the client's token 202 limits access to certain services (a sub-set of the server's services), the server 116 restricts the client's access to only authorized services. Because the messaging channel 118 between a client 110 and server 116 is persistent, neither the authenticating information nor token 202 are exchanged with each communication between the client 110 and server 116. However, when spoofing is detected, some or all of the client 110 and/or server 116 transmission may include tokens 202 to ensure that all communication originates from authorized processes.

When a mutual authentication process is practiced, the server 116 receives access rights 108 from the process manager 106 and token(s) 202 from the authenticator 112 in the same manner as those provided to the client 110. When the server 116 is authenticated, the server 116 sends its own authenticating information, routing information and a data object to the client 116. The data object includes the server's name, a unique identifier, a token 202, and an optional timestamp that may be used to authenticate the server 116 in response to the client's 110 request. Once authenticated, client 110 verifies the server's 116 access rights to serve client 110. In one implementation, the access rights allow the server 116 to communicate with the client 110.

FIG. 4 is a block diagram of an alternate secure message-based OS 400. The system 400 comprises a processor 402, a memory 404 (the contents of which are accessible by the processor 402) a message-based OS module 406, a microkernel module 408, a process manager module 410 and an access rights module 412. The memory 404 may store instructions that causes the system to render some or all of the functionality associated with the systems described herein. For example, memory 404 may store instructions that when executed by the processor 402 causes the system to enforce a security policy and/or enable security mechanisms through the channel policy files or records 420 and the application process modules: client module 416, the authenticator module 418, and the server module 422 through an input/output (I/O) interface 424. The processor 402 may include a single processor or multiple processors that are disposed on a single chip, on multiple devices or distributed in a message-based OS system. The processor 402 may be hardware that executes computer executable instructions or computer code retained in a local centralized memory 404 or in distributed memory to perform one or more features of a message-based OS.

The systems and processes shown in FIGS. 1-4 may be implemented in many different ways and with one or more enhancements. The enhancements may include using compression functions (e.g., one-way hash functions), message authentication codes, and/or message integrity checks that convert a variable-length input string into a fixed length (generally smaller) output string object that is appended with each message. The fixed length output string may serve as a fingerprint of each message. The fingerprints may be returned to a sending node when received by a recipient node to ascertain message origin, verify that the message has not been modified in transit, and prevent an intruder from substituting a false message for a legitimate one. Further, each process module such as the message-based OS module 102 and application processes modules 416, 418, 422, and 424 may be implemented in hardware or a combination of hardware and software. Each module of FIG. 4 may include an application specific integrated circuit (ASIC), a Field Programmable Gate Array (FPGA), a circuit, a digital logic circuit, an analog circuit, a combination of discrete circuits, gates, or any other type of hardware or combination thereof.

Alternatively or in addition, each module may include memory hardware, such as a portion of the memory 406 that comprises instructions executable by the processor 402 to implement one or more of the features of the modules. Because each module includes at least some hardware, some modules can be referred to as hardware modules.

Memory 406 may retain an ordered listing of executable instructions for implementing the functions described. A machine-readable medium may selectively be, but not limited to, a non-transitory electronic, magnetic, optical, electromagnetic, infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), or a database management system. The memory 406 may comprise a single device or multiple devices that may be disposed on one or more dedicated memory devices or executed by a processor or other similar device. When functions or steps are said to be "responsive to" or occur "in response to" a function or a process, the device functions or steps necessarily occur as a result of the function or message. It is not sufficient that a function or act merely follow or occur subsequent to another.

The functions, acts, or tasks illustrated in the FIGS. or described may be executed in response to one or more logic or instructions stored in or on non-transitory computer readable media. The functions, acts or tasks are independent of the particular type of instructions set, storage media, processor or processing strategy and may be performed by software, hardware, integrated circuits, firmware, micro code and the like, operating alone or in combination. In implementations, the instructions are stored on a removable media device for reading by local or remote systems. In other implementations, the logic or instructions are stored in a remote location for transfer through a computer network or over wireless or tangible communication lines.

The disclosed system and process reinforces security and reliability through security policies and security mechanisms through a small, reliable, replicable message-based microkernel OS. The message-based microkernel OS is used in many systems including embedded systems and devices that respond to real events in real time. This means that the message-based microkernel OS processes events as they happen, not later. In other words, the system processes information at the same rate as it is received, enabling direct control of a process. A wireless phone, a navigation process, or an autonomous vehicle may be an embedded system that interacts with real-time events. This means that the computing power is an integral part of the systems/processes and the real time message-based OS responds to event immediately, unbuffered, and not stored for processing later. Here, a vehicle generally includes a car, bus, truck, tractor, motorcycle, bicycle, tricycle, quadricycle, or other cycle, ship, submarine, boat or other watercraft, helicopter, drone, airplane or other aircraft, train, tram or other railed vehicle, spaceplane or other spacecraft, and any other type of vehicle whether currently existing or after-arising this disclosure. In other words, it comprises a device or structure for transporting persons or things.

The subject-matter of the disclosure may also relate, among other matters, to the following numbered aspects:

1. A system that enforces a security policy in a message-based operating system, the system comprising a processor configured to:

control access to an operating system authenticator in response to an invocation of a microkernel call that initiates a process manager function in accordance with an access right retained in a microkernel; and control access to a server serving a client in the message-based operating system according to a token issued by the operating system authenticator, the token establishing the client's access to the services provided by the server.

2. The system of aspect 1 wherein the processor is further configured to control access by a second client requesting services from the server in the message-based operating system according to a second token, the second token establishing the server's rights to communicate with the second client.

3. The system of aspect 2 wherein the server executes the invocation of the microkernel call.

4. The system of any of aspects 1 to 3 wherein the client executes the invocation of the microkernel call.

5. The system of any of aspects 1 to 4 wherein access to the server by the operating system authenticator includes a right to generate a persistent message channel between the client and the server.

6. The system of any of aspects 1 to 5 wherein the token comprises a temporal validator that provides a temporal restriction on the client's access right to a processes provided by the server.

7. The system of any of aspects 1 to 6 wherein the access to the operating system authenticator are stored in an image in a non-volatile form that does not change.

8. The system of any of aspects 1 to 6 wherein the system comprises vehicle.

9. A machine-readable medium encoded with machine-executable instructions, wherein execution of the machine-executable instructions is for:

enforcing a security policy in a message-based operating system;

controlling access to an operating system authenticator in response to an invocation of a microkernel call that initiates a process manager function in accordance with an access right retained in a microkernel; and controlling access to a server serving a client in the message-based operating system according to a token issued by the operating system authenticator, the token establishing the client's access to the processes provided by the server.

10. The machine-readable medium of aspect 9 where the machine-readable medium encoded controls access to the client requesting services from the server in the message-based operating system according to a second token, the second token establishing the server's rights to communicate with the client.

11. The machine-readable medium of aspect 10 where the server executes the invocation of the microkernel call.

12. The machine-readable medium of any of aspects 9 to 11 where the client executes the invocation of the microkernel call.

13. The machine-readable medium of any of aspects 9 to 12 where access to the server granted by the operating system authenticator includes a right to generate a persistent message channel between the client and the server.

14. The machine-readable medium of any of aspects 9 to 13 where the token comprises a temporal validator that provides temporal restrictions on the client's access to the processes provided by the server.

15. The machine-readable medium of any of aspects 9 to 14 where the access right to the operating system authenticator is stored in an image in a non-volatile form that does not change.

16. A method that enforces a security policy in a message-based operating system comprising:

controlling access to an operating system authenticator in response to an invocation of a microkernel call that initiates process manager functions in accordance with an access right retained in a microkernel; and controlling access to a server serving a client in the message-based operating system according to a token issued by the operating system authenticator, the token establishing the client's access to a service provided by the server.

17. The method of aspect 16 where the processor is further configured to control access to a second client requesting a service from the server in the message-based operating system according to a second token, the second token establishing the server's rights to communicate with the second client.

18. The method of aspect 17 where the server executes the invocation of the microkernel call.

19. The method of any of aspects 16 to 18 where the client executes the invocation of the microkernel call.

20. The method of any of aspects 16 to 19 where a grant access to the server by the operating system authenticator includes a right to generate a persistent message channel between the client and the server.

21. The method of any of aspects 16 to 20 where the token comprises a temporal validator that provides a temporal restriction on the client's access to the processes provided by the server.

22. The method of any of aspects 16 to 21 where the access rights to the operating system authenticator are stored in an image in a non-volatile form that does not change.

All of the descriptions, regardless of the particular implementation, is illustrative in nature, rather than limiting. For example, although selected aspects, features, or components of the implementations are shown as being stored in local memories, all or part of the systems or processes may be stored in, distributed across, or read from local and/or remote distributed storage media.

While various embodiments have been described, it will be apparent to those of ordinary skill in the art that many more embodiments and implementations are possible. Accordingly, the embodiments described herein are examples, not the only possible embodiments and implementations.

What is claimed is:

1. A system that enforces a security policy in a message-based operating system, the system comprising:

a processor; and a memory having instructions executable by the processor to:

control access to an operating system authenticator, in response to an invocation of a microkernel call by a client that initiates a process manager function, in accordance with an access right retained in a microkernel;

receive a data object from the client containing encrypted authenticating information;

decrypt, by the operating system authenticator, the encrypted authenticating information;

verify, by the operating system authenticator, the client identity based on the authenticating information, including comparing the authenticating information against channel policy and comparing a timestamp of the authenticating information against a current time;

issue a token by the operating system authenticator, the token establishing the client's access to the services provided by the server; and grant access to a server serving the client in the message-based operating system including a right to generate a persistent message channel between the client and the server, wherein the persistent message channel does not require exchange of the authenticating information or token with each message.

2. The system of claim 1, the memory having instructions further executable by the processor to grant access to a second client requesting services from the server in the message-based operating system according to a second token, the second token establishing the server's right to communicate with the second client.

3. The system of claim 1 wherein the server executes the invocation of the microkernel call.

4. The system of claim 1 wherein the client executes the invocation of the microkernel call.

5. The system of claim 1 wherein the authenticating information includes one or more of: a client name, a unique identifier, a timestamp, or routing information.

6. The system of claim 1 wherein the token includes a timestamp, and further wherein the token establishing the client's access to the services provided by the server until a timestamp validating process notifies the server that the token expired.

7. A non-transitory machine-readable medium encoded with machine-executable instructions for enforcing a security policy in a message-based operating system, wherein the machine-executable instructions, when executed by a processor, are to cause the processor to:

control access to an operating system authenticator, in response to an invocation of a microkernel call by a client that initiates a process manager function, in accordance with an access right retained in a microkernel;

receive a data object from the client containing encrypted authenticating information;

decrypt, by the operating system authenticator, the encrypted authenticating information;

verify, by the operating system authenticator, the client identity based on the authenticating information, including comparing the authenticating information against channel policy and comparing a timestamp of the authenticating information against a current time;

issue a token by the operating system authenticator, the token establishing the client's access to the processes provided by the server; and grant access to a server serving the client in the message-based operating system including a right to generate a persistent message channel between the client and the server, wherein the persistent message channel does not require exchange of the authenticating information or token with each message.

8. The non-transitory machine-readable medium of claim 7, execution of the machine-executable instructions is further to grant access to a second client requesting a service from the server in the message-based operating system according to a second token, the second token establishing the server's right to communicate with the second client.

9. The non-transitory machine-readable medium of claim 7 wherein the server executes the invocation of the microkernel call.

10. The non-transitory machine-readable medium of claim 7 wherein the client executes the invocation of the microkernel call.

11. The non-transitory machine-readable medium of claim 7 wherein the authenticating information includes one or more of: a client name, a unique identifier, a timestamp, or routing information.

12. The non-transitory machine-readable medium of claim 7 wherein the token includes a timestamp, and further wherein the token establishing the client's access to the services provided by the server until a timestamp validating process notifies the server that the token expired.

13. A method that enforces a security policy in a message-based operating system, the method comprising:

controlling access to an operating system authenticator, in response to an invocation of a microkernel call by a client that initiates a process manager function, in accordance with an access right retained in a microkernel;

receiving a data object from the client containing encrypted authenticating information;

decrypting, by the operating system authenticator, the encrypted authenticating information;

verifying, by the operating system authenticator, the client identity based on the authenticating information, including comparing the authenticating information against channel policy and comparing a timestamp of the authenticating information against a current time;

issuing a token by the operating system authenticator, the token establishing the client's access to a service provided by the server; and granting access to a server serving the client in the message-based operating system including a right to generate a persistent message channel between the client and the server, wherein the persistent message channel does not require exchange of the authenticating information or token with each message.

14. The method of claim 13 further comprising granting access to a second client requesting a service from the server in the message-based operating system according to a second token, the second token establishing the server's rights to communicate with the second client.

15. The method of claim 13 wherein the server executes the invocation of the microkernel call.

16. The method of claim 13 wherein the client executes the invocation of the microkernel call.

17. The method of claim 13 wherein the authenticating information includes one or more of: a client name, a unique identifier, a timestamp, or routing information.

18. The method of claim 13 wherein the token includes a timestamp, and further wherein the token establishing the client's access to the services provided by the server until a timestamp validating process notifies the server that the token expired.

* * * * *